June 28, 1955  J. H. HOLLYDAY  2,711,687
BALE TENSION MECHANISM
Filed Dec. 18, 1952  2 Sheets-Sheet 1
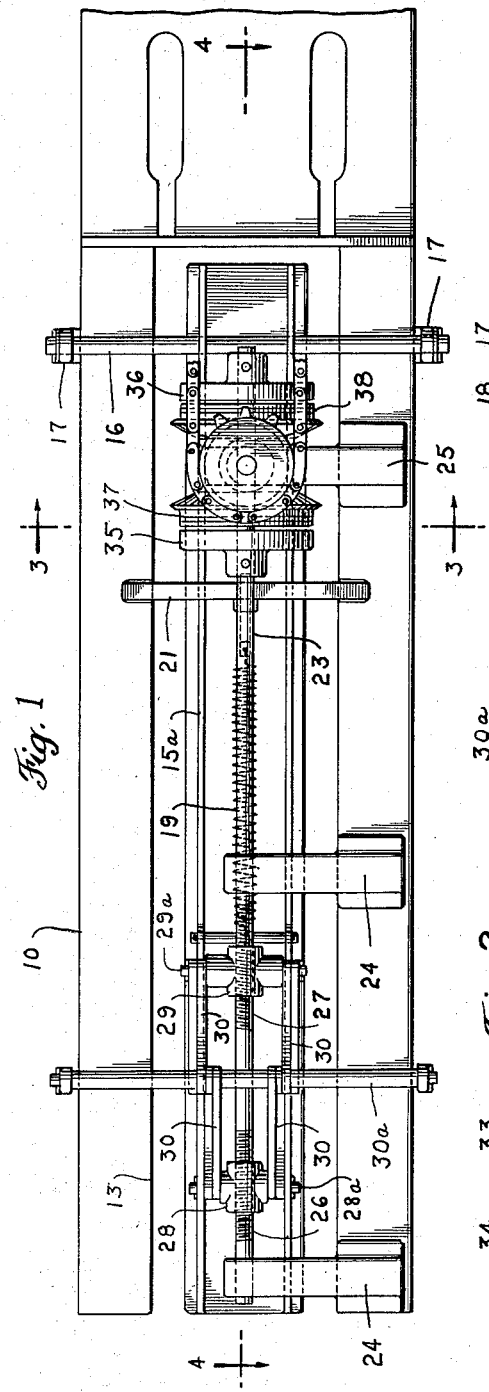
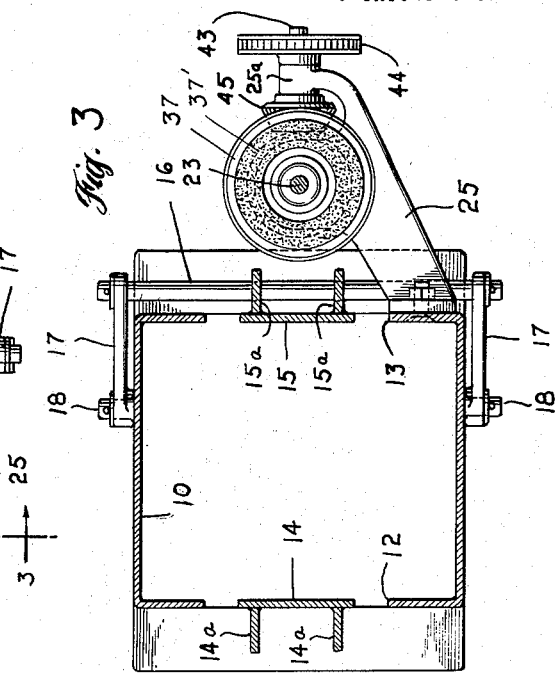
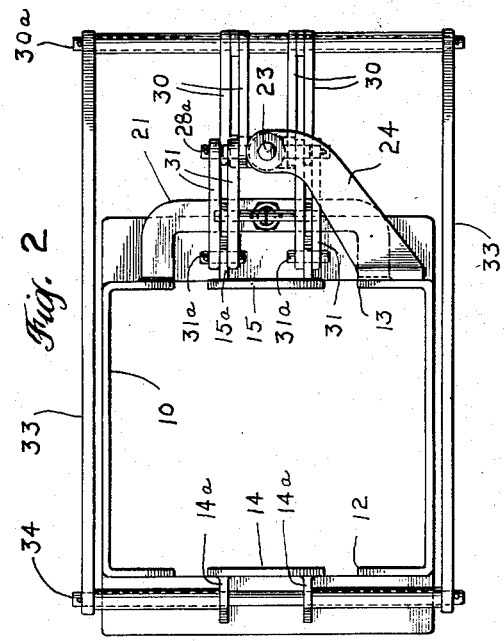
INVENTOR
James H. Hollyday
By Richard E. Babcock Jr.
ATTORNEY

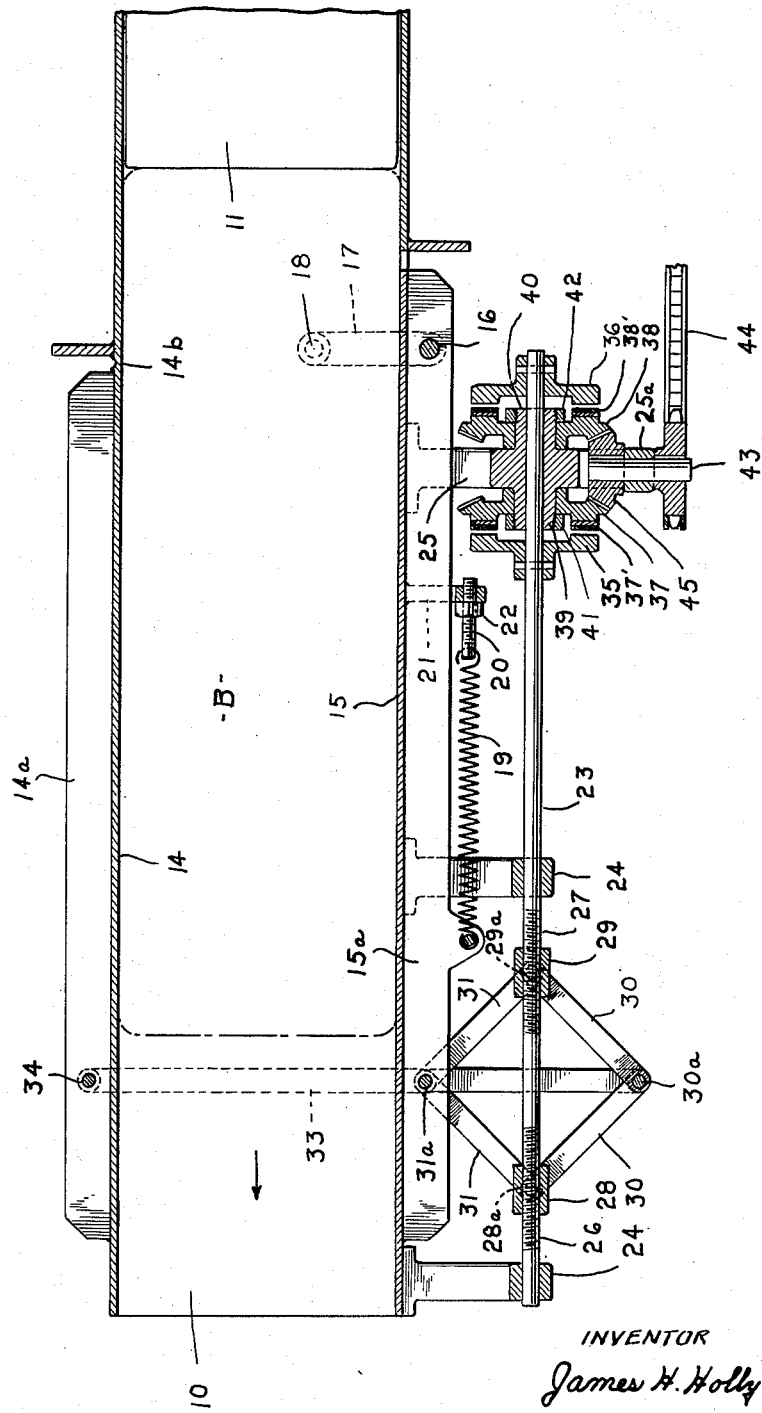

United States Patent Office 2,711,687
Patented June 28, 1955

2,711,687

BALE TENSION MECHANISM

James H. Hollyday, New Holland, Pa., assignor to The Sperry Corporation, New Holland, Pa., a corporation of Delaware Application December 18, 1952, Serial No. 326,641

11 Claims. (Cl. 100—43)

This invention relates to bale tension mechanism of the class in which tension rails or shoes are adjustable into a bale chamber to exert varying degrees of pressure against the sides of the hay bales being discharged from said chamber, to thereby provide a retarding force, the extent of which controls the density of the bales.

It is a primary object of the invention to provide bale tension mechanism which adjusts automatically in response to variations in the qualities of hay passing through a bale chamber to maintain a substantially constant opposition to the movement of said hay through the chamber and thereby attain a substantially uniform packing of the hay.

It is a further object to provide such a mechanism in which the same element which engages and exerts a retarding force against the movement of the hay also functions as a control element or feeler for controlling the automatic adjustment of the retarding pressure of said element against the hay.

It is a further object to control the pressure of said element against the hay through rotary movement of an actuating shaft which is bodily movable with the said control element and which carries clutch elements for alternate driven engagement with either of two oppositely rotating surfaces in accordance with the direction of bodily movement of said actuating shaft.

Moreover, it is an object of the invention to provide a novel means for controlling and adjusting the amount of retarding force exerted on the hay by the bale tension mechanism of the invention.

In accordance with the invention, a pair of mechanisms, preferably in the form of toggle linkages, controlled by the movement of threaded elements on threaded sections of an actuating shaft, are associated with the opposed tension rails of the bale casing to simultaneously adjust these rails in response to rotation of the actuating shaft. The toggle linkages of the preferred embodiment are associated in a novel manner with the opposed tension rails to accomplish this function.

One of the said rails is mounted for longitudinal movement with the hay in opposition to a resilient balancing spring or element, and the longitudinal movement of the rail in seeking a position of balance between the forces exerted by the hay and the resilient element, is relied upon to control an automatic means for rotating the actuating shaft to vary the pressure of the rail against the hay as may be necessary to maintain a substantially constant retarding force opposed to the discharge movement of the hay.

An important feature of the invention consists in connecting the threaded actuating shaft to the control element or rail for longitudinal movement therewith, whereby clutch means fixed on the shaft may move longitudinally into driven engagement with either of two oppositely rotating surfaces or portions of a drive mechanism, to increase or decrease the pressure of said control element or rail against the hay in accordance with the direction of such longitudinal movement.

The foregoing features and advantages are all attained by the preferred embodiment of the invention shown by way of exemplification in the accompanying drawings in which:

Figure 1 represents a side elevation view of the discharge end or portion of a bale casing of a usual hay baler having the invention applied thereto;

Figure 2, an end elevation view of the structure shown in Figure 1, as seen from the discharge end thereof;

Figure 3, a section on the line 3—3 of Figure 1, looking in the direction of the arrows; and Figure 4, a section on the line 4—4 of Figure 1 looking in the direction of the arrows.

Referring now in detail to the accompanying drawings, the reference character 10 designates the discharge end portion of a usual bale casing in which bales of hay B are compressed and discharged rearwardly (as indicated by the arrow in Figure 4) by a conventional reciprocating bale plunger 11, shown in Figure 4.

Opposite sides of the bale casing 10 are formed with rearwardly opening slots 12, 13 respectively through which the opposed side portions or tension rails 14 and 15 respectively are movable into the bale chamber to press against the sides of the bales B and frictionally retard the movement of these bales toward the discharge end of the casing 10.

The rail 14 is of conventional construction, preferably being reinforced against longitudinal flexing by the longitudinal ribs or flanges 14a, and being disposed for flexing or swinging movement transversely to the bale casing about its zone of connection 14b (see Fig. 4) with the bale casing proper.

The rail or portion 15 is mounted for swinging movement into the bale chamber about an axis defined by a pintle 16 suspended between the links 17 respectively pivoted to opposite sides of the bale casing as at 18. The links 17 and pintle 16 exemplify one means of mounting their respective end of the rail 15 both for movement into or away from the bale chamber and also for longitudinal movement, which is relied upon as hereinafter described to automatically control the degree of movement of the rails 14 and 15 into the bale chamber and thus the retarding action of same on the bales B. In view of this controlling function of the rail 15, it may be regarded as the control element of the mechanism hereinafter described.

It will be seen that the control element or rail 15 is free to move with the bales of hay B toward the discharge end of the bale casing to the extent permitted by resilient means such as a spring 19 disposed under tension between the element or rail 15 and a bolt 20 threaded longitudinally into a bracket 21 on the bale casing.

Obviously the control element 15 will be caused to move longitudinally under the combined influence of the spring 19 and the bale movement until it reaches a position where the opposed longitudinal forces exerted on it by the spring tension and by the frictional grip of the longitudinally moving bales of hay B are in a state of balance. The tension of spring 19 may be adjusted as desired by rotating the bolt 20 to the desired axial location in bracket 21, a usual jam nut 22 being provided to retain such adjustment.

Mechanism for moving the tension rails 14 and 15 into the bale chamber to varying degrees as desired to exert the proper pressure against the bales B comprises a shaft 23 extending longitudinally of the bale chamber adjacent the element 15 and supported in bearings 24 and 25 on the bale casing 10 for both rotary and axial movement. Oppositely screw threaded sections 26 and 27 on the shaft 23 have internally threaded sleeves or nuts 28 and 29 respectively threaded thereon. These nuts, which move in opposite directions responsive to rotation of the shaft 23, simultaneously actuate mechanisms which in the preferred embodiment comprise toggle linkages 30—30 and 31—31, the relatively remote ends of the links 30—30 and 31—31 of both linkages being pivotally connected to the respective nuts 28 and 29 by the pins 28a and 29a as shown.

Adjustment of the relatively remote rail 14 is controlled by the linkage 30—30, the knee or medial pivot of which comprises a pintle 30a extending across the bale case and having its ends connected by links 33 to a crossbar 34 on the upper rail 14. Adjustment of the lower rail or control element 15 is through actuation of the linkage 31—31, the knee or medial pivot 31a of which is fixedly connected to the reinforcing ribs 15a of the control element 15.

It will be noted that the two linkages 30—30 and 31—31 are located on opposite sides of the shaft 23, whereby the rotation of the shaft 23 will simultaneously move the knees 30a and 31a of the linkages and hence the rails 14 and 15 in opposite transverse directions toward or away from the longitudinal axis of the bale casing 10.

In accordance with this invention, I have provided an automatic mechanism, controlled in response to longitudinal movement of the control element or rail 15, for rotating the shaft 23 as may be required to maintain substantially constant bale retarding force on the bales B by the rails 14 and 15, despite variations in the moisture content and other characteristics of the hay from which said bales B are formed.

Essentially such mechanism comprises clutch elements or means 35 and 36 respectively fixed on the shaft 23 for longitudinal movement therewith into operative driven engagement with either of two oppositely moving drive portions or elements 37 and 38 respectively of a constantly rotating drive mechanism which may be supported on the bracket 25. In the preferred embodiment, the drive elements 37 and 38 respectively comprise bevel gears journalled coaxially with the shaft 23 on oppositely projecting hollow trunnions 39 and 40 respectively which are integral with the bracket 25. These gears are provided with oppositely axially directed clutch faces 37' and 38' respectively of a suitable frictional material to establish frictional driving connections with the respective clutch elements 35 and 36, and are secured against axial displacement by nuts 41 and 42 threaded on the outer ends of the respective trunnions.

It will be noted that the bracket 25 terminates in a bearing 25a through which is journalled a stub shaft 43. Shaft 43 is constantly rotated by a chain drive 44 from the main baler drive or other suitable source (not shown) and has fixed thereon a pinion 45 between and in mesh with the gears 37 and 38 to rotate the same in opposite directions.

Obviously other oppositely moving drive elements or surfaces may be substituted for the elements 37 and 38 which are shown merely by way of exemplification in the accompanying drawings. For instance if desired, the oppositely moving surfaces corresponding to the surfaces 37' and 38' might comprise diametrically opposite portions of a common drive element rotating about the axis 43.

*Operation*

In the accompanying drawings, the several parts of the mechanism are shown in the positions which they assume at a time when the tension of spring 19 balances the longitudinal force exerted by the bales of hay B on the control element or rail 15 through its frictional engagement with the hay. At this time the longitudinal position of the rail 15 and shaft 23 is such as to maintain both clutch elements 35 and 36 in a neutral position out of driven engagement with their respective drive means or elements 37 or 38.

In the event that the hay moving through the bale chamber would suddenly vary its characteristics as by becoming of increased moisture content with resulting increased frictional grip on the element 15, this will move the element 15 to the left in Figure 1, carrying with it the linkage 31—31 and shaft 23 until the clutch element 36 moves into driven frictional engagement with the drive element 38 which is rotating in a direction such that corresponding rotation of the shaft 23 will urge apart the sleeves or nuts 28 and 29 of the toggle linkages. The resulting movement toward each of the other of the knees 30a and 31a of these linkages will function through their connections with the rails 14 and 15 respectively to urge these rails away from each other and thus decrease the pressure of said rails against the sides of the bales B. When the pressure is sufficiently released, the tension of the spring 19 will exceed the longitudinal force transmitted to the control element 15 through the frictional engagement of the bales B therewith, and the spring 19 in seeking a position of balance with said longitudinal force will thus function to restore the shaft 23 to its original position of longitudinal adjustment and to shift the clutch element 36 out of driven engagement with the driven element 38.

In the event the longitudinal force exerted by the bales against the rail 15 should drop below the tension exerted by the spring 19, the spring will function through the rail 15 and toggle links 31—31 to move the shaft 23 to the right in Figure 1 until the clutch element 35 is in driven frictional engagement with the drive element 37. The resulting rotation of shaft 23 will be such as to urge the nuts 28 and 29 toward each other, thereby spreading apart the toggle knees 30a and 31a and increasing the pressure of the rails 14 and 15 on the bales B until the resulting increased frictional grip between the bales and rail 15 restore the rail 15 to its original position of balance in which the shaft 23 is in a neutral position of longitudinal adjustment with the clutch elements 35 and 36 disengaged from their respective drive elements.

Obviously such balancing action between the spring 19 and the opposed longitudinal forces acting on the rail 15 as a result of the bale movement will result in a substantially constant retarding force opposed to the discharge movement of the bales. It follows that this will result in the formation of substantially uniformly packed bales. Moreover, merely by adjusting the tension of spring 19, the density of the bales may be increased or decreased at will.

In this application, I show and describe only the preferred embodiment of my invention, simply by way of setting forth the best mode contemplated by me of carrying out my invention. However, I recognize that the invention is capable of other and different embodiments and that its several details may be modified in various ways all without departing from the invention. Accordingly, the drawings and description herein are to be construed as merely illustrative in nature and not as exclusive.

Having thus described my invention, I claim:

1. In a bale case having opposed side portions mounted for movement into the bale chamber to press against and frictionally retard the passage of bales through said chamber, one of said portions constituting a control element and being disposed also for longitudinal movement with the bales engaged thereby, spring means opposing such movement whereby said control element will move longitudinally to a position of balance between the forces exerted by said bales and the spring means, means for moving said side portions in or out of the bale chamber to vary the retarding action thereof on the bale movement comprising a shaft supported longitudinally of the bale chamber adjacent said control element for rotation and for longitudinal movement, said shaft being formed with oppositely screw threaded sections, nuts threaded on such sections respectively in spaced relation, a pair of toggle linkages both connected at their extremities to the respective nuts, said linkages being on opposite sides of said shaft and arranged so that rotation of the shaft will move the knees of said linkages in opposite directions transversely of the bale casing, one of said knees being pivotally connected to said control element for longitudinal movement therewith, and to cause transverse movement thereof, the other of said knees being linked to said other side portion, whereby said linkages may function to simultaneously move said side portions into or out of the bale case, and means for automatically rotating said shaft to vary the bale retarding pressure exerted by said side portions, as required to maintain a substantially constant retarding action on bales of varying qualities, said means comprising coaxially disposed oppositely rotating gears, drive means for constantly rotating said gears, said oppositely rotating gears being provided respectively with oppositely axially presented clutch faces, said shaft being disposed for coaxial sliding movement through said gears, and clutch elements fixed on said shaft on opposite sides of said gears for alternate engagement with said clutch faces to thus rotate the shaft in either direction in accordance with the longitudinal movement of the shaft.

2. In combination with a bale case defining a bale chamber and having opposed tension rails movable transversely of the bale chamber to frictionally retard the passage of hay through said chamber, one of said rails being longitudinally movable in the direction of the hay movement, spring means opposing such movement, and means common to both rails, responsive to longitudinal movement of the said one rail for causing transverse movement of both rails.

3. In a hay baler of the class in which the bale chamber is defined by a bale case having opposed tension rails movable transversely of the bale chamber to frictionally retard the passage of hay through said chamber, the combination including means mounting one of said rails for longitudinal movement in engagement with the hay, resilient means opposing such movement, a rotatable actuating shaft connected to said one rail for longitudinal movement therewith, mechanism actuated by rotation of said shaft for causing movement of said tension rails transversely of the bale chamber, a drive mechanism mounted on said bale case including relatively oppositely moving longitudinally spaced drive elements, and means fixed on said actuating shaft for longitudinal movement therewith into alternate driven engagement with either of said drive elements.

4. In a hay baler of the class in which the bale chamber is defined by a bale case, having opposed tension rails movable transversely of the bale chamber to frictionally retard the passage of hay through said chamber, the combination including means mounting one of said rails for longitudinal movement in engagement with the hay, resilient means opposing such movement, a rotatable actuating shaft connected to said one rail for longitudinal movement therewith, mechanism actuated by rotation of said shaft for causing movement of said tension rails transversely of the bale chamber, a constantly rotating drive mechanism mounted on said bale case, and means carried by said actuating shaft for establishing a driven connection thereof to said drive mechanism responsive to longitudinal movement of said actuating shaft.

5. In a hay baler of the class in which the bale chamber is defined by a bale case, having a tension rail movable transversely of the bale chamber to frictionally retard the passage of hay through said chamber, the combination including means mounting said rail for longitudinal movement in engagement with the hay, resilient means opposing such movement, a rotatable actuating shaft connected to said rail for longitudinal movement therewith, mechanism actuated by rotation of said shaft for causing movement of said rail transversely of the bale chamber, a drive mechanism mounted on said bale case including relatively oppositely moving longitudinally spaced drive elements, and means fixed on said actuating shaft for longitudinal movement therewith into driven engagement with either of said driven elements.

6. In a hay baler of the class in which the bale chamber is defined by a bale case having a tension rail movable transversely of the bale chamber to frictionally retard the passage of hay through said chamber, the combination including means mounting said rail for longitudinal movement in engagement with the hay, yieldable means opposing such movement, a rotatable actuating shaft connected to said rail for longitudinal movement therewith, mechanism actuated by rotation of said shaft for causing movement of said rail transversely of the bale chamber, a constantly rotating drive mechanism mounted on said baler, and clutch means carried by said drive mechanism and said actuating shaft respectively to connect the same for rotation together responsive to longitudinal movement of said actuating shaft.

7. In a hay baler of the class in which the bale chamber is defined by a bale case having opposed tension rails movable transversely of the bale chamber to frictionally retard the passage of hay through said chamber, the combination including means mounting one of said rails for longitudinal movement in engagement with the hay, yieldable means opposing such movement, driven means mounted for rotation on said bale case, mechanism actuated by rotation of said means for causing movement of said tension rails transversely of the bale chamber, and driving means on said baler having oppositely moving driving portions normally longitudinally spaced from the cooperating portion of said driven means, one of said means being connected to said one rail for longitudinal movement therewith to establish operative connection between said driving means and said driven means.

8. In a hay baler of the class in which the bale chamber is defined by a bale case having a tension rail movable transversely of the bale chamber, the combination including means mounting said rail for longitudinal movement in engagement with the hay passing through said chamber, resilient means opposing such movement, driven actuating means mounted for rotation on said bale case, mechanism actuated by rotation of said means for causing movement of said tension rail transversely of the bale chamber, and driving means on said baler having oppositely moving driving portions normally longitudinally spaced from the cooperating portion of said driven means, one of said means being connected to said rail for longitudinal movement therewith to establish an operative connection between said driving means and said driven means.

9. In a hay baler of the class in which the bale chamber is defined by a bale case having a tension rail movable transversely of the bale chamber, the combination including means mounting said rail for longitudinal movement in engagement with the hay passing through said chamber, resilient means opposing such movement, driven actuating means mounted for rotation on said bale case, mechanism actuated by rotation of said means for causing movement of said tension rail transversely of the bale chamber and rotary driving means supported on said baler in normally longitudinally spaced relation to said driven means, one of said means being connected to said rail for longitudinal movement therewith to establish an operative rotary connection with said other means and said means being both provided with clutch elements for establishing such a connection.

10. In a hay baler of the class in which the bale chamber is defined by a bale case having a tension rail movable transversely of the bale chamber, to frictionally retard the passage of hay through said chamber, the combination including a control element mounted on said casing for longitudinal movement in frictional engagement with the hay passing through said chamber, resilient means opposing such movement, a rotatable actuating shaft connected to said control element for longitudinal movement therewith, mechanism actuated by rotation of said shaft for transversely moving said tension rail, a drive mechanism mounted on said baler including relatively oppositely moving drive elements, and means fixed on said actuating shaft for longitudinal movement with said shaft into driven engagement with either of said drive elements.

11. In a hay baler of the class in which the bale chamber is defined by a bale case having a tension rail movable transversely of the bale chamber to frictionally retard the passage of hay through said chamber, the combination including a control element mounted on said casing for longitudinal movement in frictional engagement with the hay passing through said chamber, resilient means opposing such movement, driven means mounted for rotation on the bale case, mechanism actuated by rotation of said driven means for causing transverse movement of the said tension rail, and rotary driving means supported on said baler in normally longitudinally spaced relation from said driven means, one of said means being connected to said control element rail for longitudinal movement therewith to establish an operative rotary connection with the said other means, said driven and driving means being respectively formed with cooperating clutch elements for establishing such connection.

References Cited in the file of this patent

UNITED STATES PATENTS

| | | |
|---|---|---|
| 169,763 | Bearce | Nov. 9, 1875 |
| 532,060 | Hem | Jan. 8, 1895 |
| 1,353,252 | Lillig | Sept. 21, 1920 |
| 2,478,012 | Raney | Aug. 2, 1949 |
| 2,610,575 | Wuertz | Sept. 16, 1952 |
| 2,613,590 | Graybill | Oct. 14, 1952 |